United States Patent [19]
Guess

[11] Patent Number: 5,462,670
[45] Date of Patent: Oct. 31, 1995

[54] PROCESS FOR REMOVING OILS AND GREASES FROM AQUEOUS SOLUTION

[75] Inventor: Robert G. Guess, Beverly, Mass.

[73] Assignee: Romar Technologies, Inc., Beverly, Mass.

[21] Appl. No.: 218,891

[22] Filed: Mar. 28, 1994

Related U.S. Application Data

[60] Continuation-in-part of Ser. No. 160,240, Dec. 2, 1993, abandoned, which is a division of Ser. No. 893,978, Jun. 3, 1992, Pat. No. 5,298,168, which is a continuation-in-part of Ser. No. 682,129, Apr. 8, 1991, Pat. No. 5,122,279.

[51] Int. Cl.⁶ .................................. C02F 1/62; C02F 1/70
[52] U.S. Cl. .................... 210/713; 210/717; 210/719; 210/720; 210/721; 210/722; 210/912; 210/913; 210/914; 210/724; 75/712; 75/714; 75/739; 204/DIG. 13
[58] Field of Search ...................... 210/710–713, 210/716, 717, 719, 720, 721, 722, 724, 757, 763, 911, 912, 913, 914, 747; 75/712, 714, 715, 739, 740, 741; 423/515; 204/DIG. 13

[56] References Cited

U.S. PATENT DOCUMENTS

| | | | |
|---|---|---|---|
| 1,479,542 | 1/1924 | Hirschkind | 75/739 |
| 3,216,790 | 11/1965 | Murib | 423/515 |
| 3,226,185 | 12/1965 | Gyan et al. | 423/515 |
| 3,260,593 | 7/1966 | Zimmerley et al. | 75/117 |
| 3,634,071 | 1/1972 | Spedden et al. | 75/109 |
| 3,770,630 | 11/1973 | Kamperman | 210/719 |
| 3,902,896 | 9/1975 | Borbely et al. | 75/109 |
| 4,076,795 | 2/1978 | Tiethof | 423/515 |
| 4,157,980 | 6/1979 | Tiethof | 423/515 |
| 4,599,177 | 7/1986 | Hayashi et al. | 210/719 |
| 4,698,162 | 10/1987 | Guilbault et al. | 210/710 |
| 4,859,447 | 8/1989 | Sanglet | 423/515 |
| 5,039,428 | 8/1991 | Wentzler | 210/710 |
| 5,102,556 | 4/1992 | Wong | 210/724 |
| 5,122,279 | 6/1992 | Guess | 210/717 |
| 5,298,168 | 3/1994 | Guess | 210/713 |

*Primary Examiner*—Neil McCarthy
*Attorney, Agent, or Firm*—Bookstein & Kudirka

[57] ABSTRACT

A process for removing dissolved oils and greases from an aqueous solution which also may contain dissolved heavy metals is provided wherein the aqueous solution is mixed with a source of ferrous ion and dithionite ion in a first step at acidic pH to reduce and permit removal of solid heavy metal, is present and to separate oils and greases from the aqueous solution. Solution from the first step if reacted in a second step with hydroxide slurries obtained from third and fourth steps. A second step solution from the second step is reacted in a third step with an alkali composition and a third solution. Optionally, the third solution is reacted with a chelating agent for iron and an oxidizer in a fourth step. A solution of chelated iron from the fourth step, when practical is disposed of. Oils and greases are recovered from the first step such as by skimming.

39 Claims, 1 Drawing Sheet

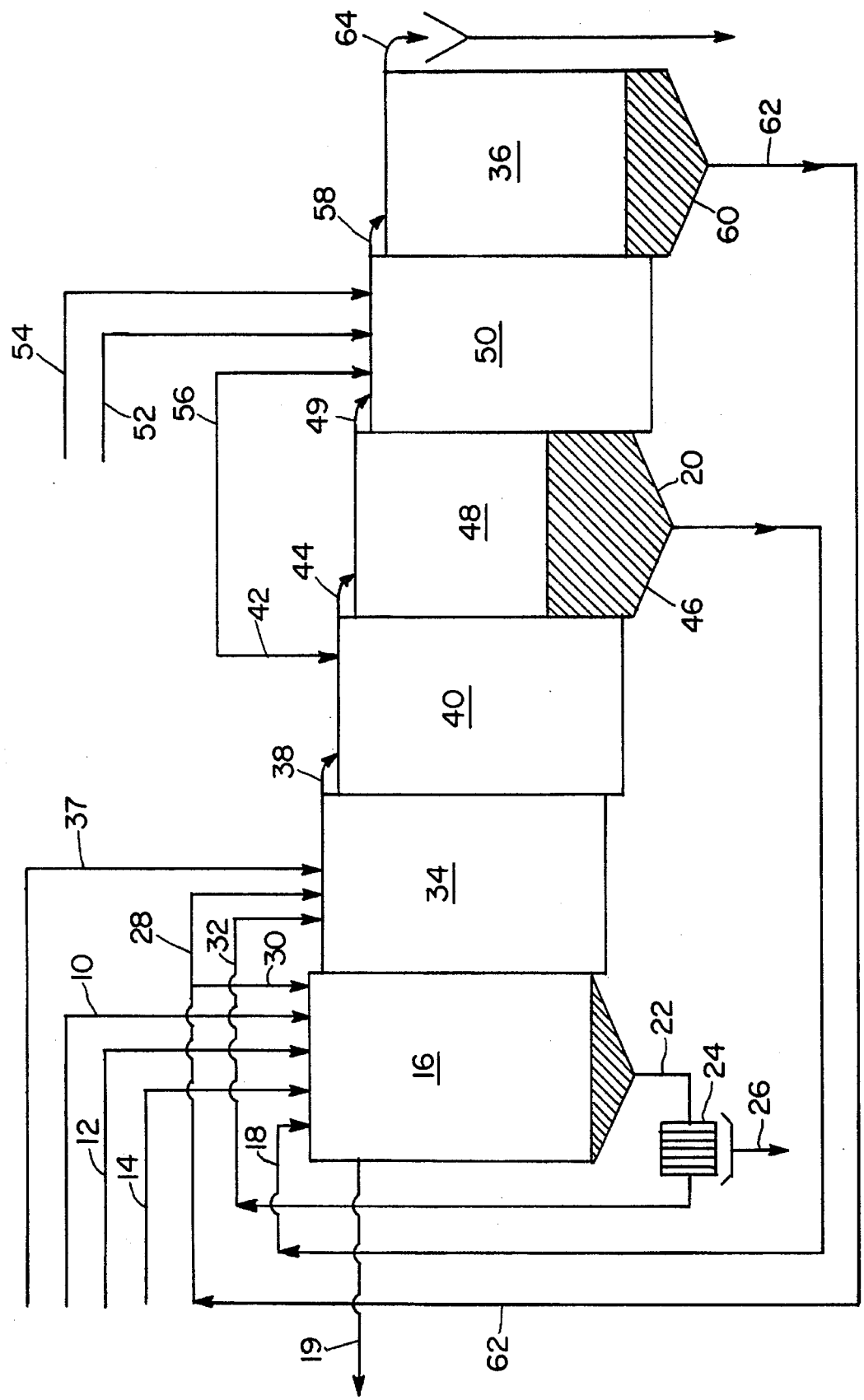

PROCESS FOR REMOVING OILS AND GREASES FROM AQUEOUS SOLUTION

REFERENCE TO RELATED APPLICATIONS

This application is a continuation-in-part of application Ser. No. 08/160,240 filed Dec. 2, 1993, abandoned, which in turn is a divisional application of Ser. No. 07/893,978 filed Jun. 3, 1992, U.S. Pat. No. 5,298,168, which in turn, is a continuation in part of application Ser. No. 682,129, filed Apr. 8, 1991, now U.S. Pat. No. 5,122,279.

BACKGROUND OF THE INVENTION

This invention relates to a process for effectively and completely removing oils and grease from aqueous solutions utilizing an alkali reagent, an acidic reagent and iron hydrosulfite (ferrous dithionite). More particularly, this invention relates to such a process wherein hazardous sludge is eliminated, oils and grease are recovered and an effluent having very low biological toxicity is produced. The present invention is also useful for treating waste waters generated by industries such as metal plating, metal surface finishing or printed circuit manufacturing which contain oils and greases as well as dispersed heavy metals.

At the present time, petroleum based as well as animal based greases are used in conventional metal plating, metal finishing and metal forming processes. The oils and greases are utilized, for example, as a temperature quenching medium or as a lubricant. These oils and greases also are utilized under conditions wherein they become solubilized in aqueous solutions also utilized in the process. The oils and greases can be preset in aqueous solutions which may also contain dissolved heavy metals or can be present in aqueous solutions free of dissolved heavy metals. In any event, resultant aqueous compositions must be treated to remove the oils and grease prior to disposing the aqueous solution in order to prevent undesired pollution. At the present time, such solutions are treated with a flocculating composition such as ferric chloride, ferrous or ferric hydroxide or ferric sulfite in order to precipitate the oil and grease in the form of a sludge. These processes are undesirable since the sludge must be recovered, treated to reduce its water content and then stored. Such a procedure is expensive and hazardous waste is produced which must be stored in compliance with current environmental laws. In addition, oil and grease removal utilizing these process is incomplete in that detectable amounts of oil and grease are retained in the aqueous stream directed to waste.

Prior to the present invention, it has been generally accepted that plating waste metals removed from alkaline solutions as metal hydroxide sludges must be handled as hazardous wastes. Environmental Protection Agency (EPA) jurisdiction over these wastes is well established. When generated by an electroplating facility and shipped off site, such sludge materials are defined as categorical F006 hazardous waste. Transporting and receiving and processing of these materials, even for reclamation and recycling, are restricted to EPA or State licensed operators. Due partly to this, and also due in part to the low metal concentration in such sludges, high recycling costs are incurred that usually exceed the recoverable value of the metals.

Prior to the present invention, methods for producing ferrous dithionite (iron hydrosulfite) have been explored as a possible new way to make sodium hydrosulfite. Sodium hydrosulfite is manufactured by several methods and several hundred million pounds per year are used worldwide each year. It is mainly used for, 1) bleaching woodpulp for newsprint, 2) reducing textile vat dyes, and 3) reductive leaching of ferric oxide from kaolin clays. All these major uses for hydrosulfite are for whitening or enhancing the color stability of materials to which it is applied. Most iron compounds are black or dark colored, thus discouraging the use of iron hydrosulfite for any of these major applications of sodium hydrosulfite.

U.S. Pat. No. 4,076,791 discloses improvements in making iron hydrosulfite and converting it to sodium hydrosulfite. More than 90% of the iron must be removed and replaced by sodium in order to use the resulting solution for leaching kaolin. A large volume of iron precipitate is produced which absorbs and wastes a large portion of the hydrosulfite, causing this process to be uneconomical. Prior to the present invention, with the exception of applicant's prior U.S. Pat. No. 5,122,279, no commercial use for iron hydrosulfite had been developed and efforts to develop iron chemistry in connection with hydrosulfite were abandoned.

Ferrous sulfate has been used to stabilize a sodium dithionite solution. In Japanese Patent JP 54029897, a 2% solution of sodium dithionite was used to decolorize dyeing wastewater containing Prussian Brilliant Red H3B [23211-47-49. Adding some ferrous sulfate to the dithionite solution improves the stability of the decolored wastewater solution. There is no mention of any interaction or involvement by heavy metals existing in this prior work relating ferrous ion to dithionite ion.

Metallic iron has long been known to react directly with certain other metals that are dissolved in acidic aqueous solutions. The iron dissolved into the acidic solution and the other dissolved metal deposits a metallic layer on the surface of the iron. Referred to as metallic replacement or cementation, this characteristic of metals has commonly been used in the commercial extraction of copper from ores and acid leaching of mine tailings. After some time, the surface of the iron is so covered with the other metal that the iron becomes unreactive and the reaction ceases.

U.S. Pat. No. 3,902,896 addresses this limitation and discloses the use of a soluble thiosulfate compound to aid the cementation of such metals as copper, silver, gold and platinum group metals from aqueous solutions. The patent discloses that the cemented metal flakes off the base metal, exposing fresh surfaces. Two properties of thiosulfate limit its utility for this purpose. In strong acid solutions, thiosulfate decomposes to sulfur dioxide and elemental sulfur, which is colloidal and coats all surfaces it contacts. Also, dilute thiosulfate solutions are very corrosive on ferrous alloys, particularly on stainless steel materials.

U.S. Pat. No. 3,634,071 describes the use of sulfur dioxide for reducing ferric ions contained in recirculated ore leaching acid solutions. Some improvements in the cementation of copper using metallic iron were observed as relating to decreased oxidation of the iron and copper metals by ferric ions. No reference is made to dithionite. At the high sulfuric acid concentrations noted, it is very unlikely that dithionite ion could exist.

U.K. Patent Application GB 125828 A, filed Jun. 16, 1983 discloses a process for removing copper ion from solution by contacting the solution with steel wool, converting only a small portion of the iron into copper. This process is commercially undesirable due to 1) the uneconomically low conversion of iron to copper, and 2) handling the materials. The recovered copper has a lower recycling value due to the cost of processing required for separating it from the residual steel wool fibers.

Many other methods exist for removing heavy metal ions from aqueous solutions, and which are commonly practiced in the pretreatment of industrial wastewaters containing environmentally toxic metals. When dissolved heavy metal solutions are free of chelating agents, they can be effectively treated by simply admixing an alkaline or caustic compound to precipitate the insoluble metal hydroxide. Sodium hydroxide, soda ash, lime or magnesium hydroxide slurry are all used to do this.

Frequently, however, complexing ammonium ions of chelating compounds such as the sodium salts of etheylenediaminetetraacetic acid (E.D.T.A.) and others having similar properties are present. They occur as ingredients in the used plating baths, cleaners and brighteners drained into the wastewater. In such cases, it is necessary either; 1) to use a strong chemical that breaks the chelant-to-heavy metal bond and forms a stable, insoluble compound or complex of the toxic metals, or 2) to add a substance that exerts a stronger attraction for the chelant than does the toxic metal ion, to free the heavy metal to precipitate as an insoluble hydroxide. Processes of both types are currently practiced.

Sodium sulfide is used to effectively precipitate heavy metals. Its sole advantage is the extremely low solubility of most heavy metal sulfides. Most are capable of existing in the presence of even the strongest chelating agents. Also, metal sulfide precipitates are slimy and difficult to filter. Large quantities of flocculants and filter aids are used, generating large volumes of sludge and corresponding high disposal costs.

Sodium borohydride is a strong, water soluble reducing agent that has an advantage of producing a compact semimetallic sludge. There are several reasons for its not having broad acceptance for heavy metal removal in waste-water treatment: 1) it is very expensive, 2) precipitated metals easily reoxidize and redissolve in the presence of dissolved ammonia, 3) dangerous concentrations of potentially explosive hydrogen gas can accumulate in the space above a reaction using sodium borohydride, and 4) at times when pH is not controlled perfectly, reactions occurring at an elevated pH of 8 or higher give off toxic fumes of hydrogen sulfide gas, dangerous to workers and sensitive equipment.

Hydrazine is another strong reducing chemical capable of breaking a metal ion bond to chelants. It is used to a limited extent for heavy metal removal, but like borohydride, lacks widespread acceptance. Partly because it too is very expensive to use, and it too can generate dangerous volumes of hydrogen gas when acidified, hydrazine has also been placed on a list of chemicals suspected of being carcinogenic. This has been a major impediment to its industrial use.

Several compounds have been used that form insoluble metal complexes with heavy metal ions. All exert a stronger attraction to the metal ion than the chelants normally occurring with the metals in the wastewaters. Insoluble starch xanthate is one such material, reportedly effective at complete removal of dissolved metal from the water. Its drawback is its generation of huge volumes of sludge, which retains a high water content and costs the user a severe penalty for disposing of same as a hazardous waste.

Other such complexing agent has gained widespread use including sodium dimethyldithiocarbamate (D.T.C.) and sodium diethyldithiocarbamate (D.E.T.C.). These are fairly effective at completely removing the heavy metal ions from solution. However, D.T.C. products are quite expensive and generate quite high volumes of sludges which requires costly reclaiming in order to recycle the recovered heavy metal. The precipitate is light in density and difficult to gravity settle, and it also gives off a foul smelling odor that is characteristic of the D.T.C. products. In addition, the dithiocarbamate compounds exhibit acute biological toxicity toward aquatic plant and animal species. Sodium dimethyldithiocarbamate is also used as the active ingredient in several EPA registered pesticide products.

At the present time, strict biological toxicity standards are being enforced upon industries by municipal sewerage authorities. Effluent toxicity is measured by placing live specimens of plant and animal species in diluted samples of such treated wastewaters. Recent data indicate that interactions exist between very low concentrations of certain heavy metals such as copper and silver, and certain anions such as nitrate, which produce more toxicity than is attributable to each component by itself. The implication of these developments is that even lower levels of removal of heavy metal ions from industrial effluents is required. A costly evaluation of background toxicity factors is required when an industry's effluent fails to meet specific toxicity limits.

All chemical methods for removing heavy metal from industrial wastes and wastewater that are of practical use and in actual practice involve chemical reactions that precipitate the metals from alkaline solutions. Certain of these processes involve chemical reduction to metallic form and others produce metal compounds, either insoluble organometallic complexes or metal sulfide or hydroxide sludges. The sludges of all these processes are fairly soluble in acidic water and the heavy metals are rapidly redissolved if the material is exposed to strongly acidic water.

The conventional wastewater treatment process, perhaps most frequently used by the largest number of industries, uses ferrous sulfate heptahydrate powder. Ferrous ion is substituted at a controlled acidic pH of about 2 to 3, to replace toxic heavy metal ions that are bonded by chelating agents. This allows the heavy metal ions to be rendered insoluble as hydroxides which are precipitated from an alkaline solution.

In the presence of strong chelants or free ammonia dissolved in alkaline solutions, a large excess of this source of ferrous ion is required. Normally, 5 to 10 ferrous ions are added for each copper ion being removed from chelated waste-waters. In heavily chelated streams, as many as 25 to 30 ferrous ions per heavy metal ion may be required in order to prevent the chelants from dissolving the heavy metal hydroxide. The commercial ferrous sulfate has seven waters of hydration and is only about 20% iron by weight. In some cases, over 100 pounds of ferrous sulfate powder is added to the wastewater for each pound of chelated or ammoniated copper removed generating 60 to 80 pounds of sludge.

In typical treatment systems, each additional pound of iron used adds about 4 pounds to the weight of sludge made. This can be reduced to about 3 pounds of dry sludge per pound of iron if a sludge dryer is used. When ferrous sulfate is dissolved into wastewater, it causes acidity in the water. Each mole of iron introduced this way requires using two moles of sodium hydroxide to neutralize the iron and form ferrous hydroxide. Therefore, when large excess amounts of ferrous sulfate heptahydrate powder are used, the total chemical cost for treatment is compounded. Higher hazardous waste sludge disposal costs are also incurred.

Sodium hydrosulfite is a strong, water soluble reducing agent. It can reduce heavy metal ions to zero valance and produce a metallic precipitate that is resistant to reoxidation. Commercial products are available as either a 13–14% buffered solution or as 85–95% powder. However, sodium hydrosulfite solutions are quite unstable and have a very short shelf life. Storage tanks need to be refrigerated and inert gas blanketed. The powdered products have an acrid odor and a dust that is extremely irritating to a worker's eyes and nose. Damp or wet powder can spontaneously ignite into flames, creating a toxic smoke of sulfur dioxide. These objectionable properties have prevented sodium hydrosulfite products from gaining any major share of usage for heavy metal removal or for wastewaters treatment in general.

Accordingly, it would be highly desirable to provide a process for removing oils and greases from aqueous solutions which may or may not contain dissolved heavy metals which eliminates or substantially eliminates the production of sludge containing the oils and greases. In addition, it would be highly desirable to provide such a process wherein the oils and greases are recoverable. Such a process would permit either the reuse of the oils and greases in the original treatment process or make them available as fuel. Furthermore, it would be desirable to provide such a process which is also capable of removing heavy metals from aqueous solutions containing oils and greases. Such a process would be highly desirable to clean aqueous effluents from a wide variety of metal treatment processes.

It also would be highly desirable to provide a safe, simple, reliable and economical process for removing heavy metals from aqueous solutions that would;

1) yield a superior quality aqueous effluent that is low in biological toxicity and compliant with all regulations for discharging into a public sewer or waterway, and, 2) eliminate producing an F006 hazardous waste sludge that is normally generated at an alkaline pH and usually has a low metal content, and, 3) reclaim the metals in a concentrated metallic form that yields a net positive value when recycled, and, 4) use readily available and economical materials that are non-hazardous and do not cause irritating or foul odors or explosive gases.

SUMMARY OF THE INVENTION

The process of this invention comprises three or four distinct steps which produce separated oils and greases from aqueous compositions and which produce solid heavy metal which are recovered when dissolved heavy metal is present. Slurries which are produced in the process are recycled within the process and a nontoxic effluent aqueous solution. The process of this invention materially reduces the ratio of iron to oil and grease necessary to remove the oil and greases from aqueous solutions as compared to conventional processes.

In accordance with a first step of the present invention, ferrous dithionite is reacted with a hydroxide slurry containing oils and greases and with dissolved heavy metal ions in acidic water in a novel process which requires and uses both ferrous and dithionite ions. Heavy metals, when present are provided from an initial solution to be treated. Redissolved heavy metal hydroxide containing oils and greases are recycled to the first step from third and or fourth steps described below. Ferrous ion also can be provided from recycled and redissolved ferrous hydroxide from the third and/or fourth steps. The dithionite ions reduce the heavy metal ions to zero valence in the presence of ferrous ions. When a chelating agent is present in the acidic water, the ferrous ions bind to the chelant compound replacing the heavy metal ions previously bonded, in the presence of dithionite ions. The reducible heavy metals form metallic particles that are suitable for economical recycling and reuse. The heavy metallic particles are recovered by gravity settling or filtering from the acidic solution. Oils and greases are separated from the acidic aqueous solution and are recovered such as by skimming.

Ferrous dithionite is preferably generated in-situ by a reaction between iron particles and bisulfite ions in the acidic solution. The same resulting composition and beneficial effects can be obtained by several routes or alternative materials. Adding both a soluble dithionite compound and a soluble ferrous compound, either separately or in a combined form, into the acidic solution that can contain heavy metals can achieve the desirable result. Such other sources of dithionite and ferrous ions can include, for example, sodium hydrosulfite and ferrous sulfate. The dithionite provides an effective means for reducing ferric ion to ferrous ion so that in the process ferrous and ferric ion can be recycled to thereby reduce the quantity of iron added to the process. When combined together in the presence of dissolved heavy metal ions in an acidic aqueous solution, dithionite and ferrous ions are equally useful in separating oils and greases as well as in precipitating heavy metals, whether generated in-situ or each is added to the reaction from separate origins.

Oils and greases are separated from the acidic aqueous solution in the first step and are recovered. The acidic supernatant aqueous liquid from the first step contains dissolved ferrous ions and dithionite ions. It is useful in this process for removing dissolved heavy metals from dilute solutions of chelated heavy metals, such as process rinse waters. Alternatively, water can be added to the second step. When the aqueous residual liquid of the first step is added to a dilute acidic solution of heavy metals, the second chemical reaction step of this process occurs that removes some dissolved heavy metal. Also, feeding to this second step can be a flow of slurry containing ferric hydroxide solids recycled from the third step and/or the fourth step. The introduction of ferric ion in the presence of heavy metal ions and dithionite ions and chelating ions facilitates breaking the chelant attractions toward the heavy metals and also improves the settling of solids produced in the downstream third step.

The liquid effluent from the second step is directed to the third step, and the dilute solution is neutralized to an intermediate pH, between about 5 and 10, (slightly acidic to slightly alkaline), by adding a suitable caustic alkaline compound. At a pH between about 5 and 10, heavy metal hydroxides co-precipitate together with the oils and greases from the solution as a dense, fast settling mixture of reduced heavy metal particles, ferrous hydroxide, and heavy metal hydroxide solids containing the oils and greases. This settled oil and grease, metal hydroxide and metallic particle-containing slurry is found to be further useful in this process for neutralizing the strong acidity contained in some of the concentrated metal plating and etching and regenerant solutions that can be reclaimed in the first step of this process. The metal hydroxides are an effective substitute for purchased new caustic. The heavy metal content in the hydroxide slurry of the third step is effectively concentrated at a higher concentration than occurring in the dilute solution, which provides for a more efficient performance of the ferrous dithionite reduction that forms metallic particles of the heavy metal. The slurry produced in the third step can be recycled to the first step, the second step, the third step, and/or a fourth step. A portion of the slurry can be withdrawn from the process for disposal in order to control the iron inventory within the process, thereby to avoid excessive build-up of iron in the process.

The supernatant effluent from the settling of the third reaction flows to an optional fourth step, a mixed reaction wherein is added a strong oxidizer to ferric ion. Alternatively, the chelant and oxidizer need not be added to the process thereby eliminating the fourth step. In another alternative process, the chelant and/or the oxidizer can be added to the second steep and/or the third step.

A portion of the ferric iron is chelated and remains dissolved and stable in the effluent solution. This is controlled by the flow of chelant feeding into this fourth reaction step. Just enough chelant is added to the balance, and on average to equal, the net input of iron into the overall process. This use of a chelant greatly reduces or eliminates producing and disposing of an undesirable hydroxide sludge. The chelated iron is dissolved and the common chelate complexes of ferric iron do not exhibit any known toxicity to biological systems. Thus, the iron can be safely removed from the process as a solution sent to the sewer. The solution sent to the sewer is substantially free of oils and greases as well as heavy metals down to nondetectable levels utilizing conventional detection apparatus such as atomic absorption spectrophotometers.

All residual reducing agents are destroyed in the step where oxidizer is added so that the oxidation reaction eliminates the oxygen scavaging effect of the reducing agents. This oxidation step eliminates any residual formaldehyde, for example, which is toxic and normally present in electroless plating baths.

The excess iron feeding to this optional fourth reaction, which is the portion that exceeds the holding capacity of the chelating agents, precipitates as insoluble hydrated ferric oxide. A desirable portion of this ferric containing slurry is recycled back to the first reaction step, and/or the fourth reaction step. This recycling provides the more attractive ferric ions to the replacement bonding with chelating agents and frees heavy metal ions to more readily form hydroxides in the third stage reaction. When no precipitated alkaline heavy metal hydroxide or ferrous hydroxide or any mixtures thereof are withdrawn and disposed of or recycled in the form of sludge or other waste, then it can be fairly stated that this process totally eliminates the generation of such regulated F006 sludges. Alternatively, when the process contains insufficient chelant to form iron chelates, and no chelant is added, a small portion of the ferric oxide or hydroxide-rich slurry can be removed from the process in order to control iron inventory with the process. In any event, the oils and greases are removed and recovered from the first step.

In one aspect of this invention, a novel reactant composition is provided by this invention which is reactive to precipitate heavy metals and to separate oils and greases.

BRIEF DESCRIPTION OF THE DRAWINGS

The FIG. 1 is a schematic diagram illustrating the process of this invention.

DESCRIPTION OF SPECIFIC EMBODIMENTS

In accordance with the method of this invention, an aqueous solution containing oils and/or greases is contacted with an alkaline reagent in order to form metal hydroxides. The metal hydroxides entrain the oils and greases thereby to remove them from the solution in the form of a pumpable sludge. The hydroxide sludge is recovered and admixed with an acidic solution containing ferrous dithionite. The ferrous dithionite reduces the hydroxides which effects precipitation of any heavy metals in the solution as metal which is removable from the acidic solution. In addition, the acid in the solution effects dissolution of the hydroxide to form a solution from the sludge and also effects liberation of the oils and grease from the sludge. The oils and grease form a top distinct liquid layer which floats in the aqueous solution which can be recovered by any convenient means such as by skimming. The recovered oils and greases can be recycled for use in a metal treatment process or be disposed of safely such as burning. While the mechanism by which the oil and grease are separated is not clear, it is believed that they are initially entrained by the formed hydroxide sludge and that the acidic ferrous dithionite solution assists in coalescing the oils and grease freed from the dissolved hydroxide sludge. In addition, the dithionite promotes reduction of ferric ions to ferrous ions which, in turn, reduces the requirement for introducing ferrous ions to the process of this invention.

When aqueous solutions to be treated in accordance with the present invention also contain dissolved heavy metals, ferrous dithionite is utilized in a first step to precipitate heavy metals and to coalesce oils and greases from aqueous solutions. In a preferred method, iron particles and a bisulfite compound or suitable bisulfite precursor are admixed with acidic aqueous solution containing dissolved heavy metal ions. The metallic iron reacts with the bisulfite ions, producing ferrous dithionite in the presence of the heavy metal ions and in accordance with Equation 1.

$$Fe + 2(HSO_3^-) + (2H^+) \rightarrow (Fe^{++}) + (S_2O_4^=) + 2H_2O \qquad \text{(Equation 1)}$$

Under the slightly acidic condition provide, the dithionite ions react instantly with and reduce the heavy metal ions present to zero valence metallic particles. The dithionite ions are thus oxidized and become regenerated as reactive bisulfite ions, as shown by Equation 2.

$$(S_2O_4^=) + (HM^{++}) + 2H_2O \rightarrow HM + 2(H^+) + 2(HSO_3^-) \qquad \text{(Equation 2)}$$

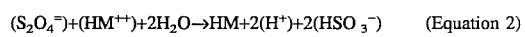

Therefore as shown by Equations 1 and 2 wherein HM is a heavy metal, this reaction is self-regenerating in the bisulfite ion when the reactions are performed simultaneously and in-situ. This method provides a very efficient utilization of the bisulfite ion or its suitable precursor. The bisulfite-dithionite redox cycle promotes the indirect reducing reaction between the metallic iron and the heavy metal ions.

When chelating agents are present in the aqueous solutions being treated the ferrous ions produced in Equation 1 also are beneficially utilized by bonding to chelating agents [CA=] which were previously bound to heavy metal ions. This reaction is defined by Equation 3 as follows:

$$(Fe^{++}) + [CA^=] \cdot (HM^{++}) \rightarrow (HM^{++}) + [CA^=] \cdot (Fe^{++}) \qquad \text{(Equation 3)}$$

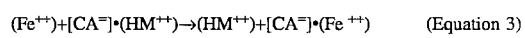

The reaction defined by Equations 1, 2 and 3 are effected at a pH between about 1 and 7, preferably between about 2 and 4. A practical trade-off between faster reactions at lower pH values versus more efficient use of reactants at higher pH values is required which may result in varying choices from solution to solution being treated. The upper pH limit may also be governed by the tendency to form insoluble metal hydroxides at pH values approaching neutral between about 5 and 7. The higher the concentration of dissolved metals, the lower the pH at which the insoluble hydroxides begin appearing. It is desirable to avoid hydroxide formation prior to removing the metallic heavy metal particles in order to avoid imparting hazardous waste characteristics of acid soluble heavy metal content into the reclaimed heavy metal particles.

Metal ions generally have a more positive oxidation potential when bonded to a chelate complex. Upon being dissociated from the chelant complexes by the ferrous ion, the heavy metal ions have a more negative oxidation potential and are therefore more reactive with and more readily reduced by the dithionite ion. This mutual and beneficial interaction between the ferrous ion, the chelated heavy metal ions, and the dithionite ion is important and useful in the present invention when chelating agents are present.

The present invention permits the use of a reactor vessel of suitable design for the first step reaction which allows the finely divided heavy metal particles to settle from the outflowing liquid and to coalesce the oils and greases. By gravity settling, a thick, dense slurry of the heavy metals can be recovered. Filtering this slurry and rinsing and drying the recovered solids produces a concentrated, highly metallic form of material, suitable for recycling and reuse of the metals in other processes.

In accordance with the present invention, the terms "oils" and "greases" are meant to include petroleum based organic compounds including hydrocarbons such as petroleum distillates and lubricating oils, as well as organic compounds derived from animal and vegetable sources such as lard, tallow, fish oil, palm oil or coconut oil.

Also in accordance with the process of this invention, ferrous dithionite is utilized to reduce heavy metal ions to metallic particles of said heavy metals. By the term "heavy metal" as used herein, is meant a metal having:

1) an atomic weight heavier than calcium, that is greater than 40.08, and 2) its compounds exhibit biological toxicity when released into the environment.

Representative heavy metals include copper, zinc, nickel, tin, lead, cadmium, cobalt, mercury, chromium, zinc, manganese, silver, gold, platinum, palladium, vanadium, arsenic, antimony, bismuth, indium, rhodium, ruthenium, technetium, molybdenum, niobium, osmium, iridium, uranium, lanthanides, actinides, and mixtures thereof.

As set forth herein, one precursor raw material source of ferrous dithionite hereunder comprises the novel composition of this invention. However, it is to be understood that the process of this invention using ferrous dithionite for removing oils and greases as well as heavy metals from water can be utilized regardless of the source or form of the ferrous dithionite or precursors of ferrous dithionite, or bisulfite used to react with the metallic iron particles, and regardless of the source or form of the metallic ion on particles used.

For example, a solution of acidic sodium or potassium or ammonium bisulfite can be made up by dissolving in water to a desired concentration, sodium or potassium or ammonium metabisulfite. Likewise, sodium hydroxide or potassium hydroxide or ammonium hydroxide solutions can be treated with liquid or gaseous sulfur dioxide to produce a usable solution containing bisulfite ions. Any or all of these ingredients can be added separately or in combination directly into the heavy metal containing aqueous solution into which the metallic iron is directly added.

In another method, a ferrous dithionite solution consists of ferrous ions and dithionite ions, each provided by separate means. The dithionite ions can be provided from sodium hydrosulfite and the ferrous ions can be provided from ferrous sulfate. When both such materials are added, either combined or separately, to an acidic heavy metal solution, the desired results of the process of this invention occur.

Similarly, when bisulfite ions are exposed to the reducing influence of sodium borohydride under certain conditions, dithionite ions are produced. When such borohydride reaction with bisulfite ions occurs in the presence of ferrous ions or ferric ions which are reduced to ferrous ions, then ferrous dithionite as applicable hereunder is formed. When such ferrous dithionite is either formed or admixed in the presence of heavy metals, then the process of this invention is obtained.

Alternately, when metallic zinc is contacted with an aqueous solution containing dissolved bisulfite ions, such as occurs when sulfur dioxide is dissolved in water, dithionite ions are produced. When such dithionite ions are used or produced in the presence of ferrous ions and heavy metal ions in aqueous solution, or are added into such a solution containing both ferrous ions and heavy metal ions, the process of this invention is obtained.

A novel reactant composition is provided by this invention which is reactive to precipitate heavy metals and to coalesce oils and grease. The composition comprises an aqueous solution of (a) ferrous ions, (b) sulfite or bisulfite ions or a mixture thereof and (c) dithionite ions at a pH between about 1 and 7, preferably between about 3 and 4. The proportion of ferrous and sulfite and/or bisulfite compounds used to make up this composition are such that between about 0.1 and 10.0 moles, preferably between about 0.5 and 0.2 moles of sulfite and/or bisulfite are present with each mole of ferrous ion. The molar ratio of (c) dithionite ion to (a) ferrous ion is between about 0.01 and 1.0, preferably, between about 0.1 and 0.5. Any source of ferrous ions can be utilized such as ferrous sulfate, ferrous chloride, ferrous nitrate, iron particles or the like. Suitable sources of sulfite or bisulfite include alkali metal sulfites or bisulfites or $SO_2$. Suitable sources of dithionite iron are set forth above.

While the size of the iron particles is not critical to the present invention, faster reactions are obtained with smaller particles of iron. More finely divided particles provide a greater surface area. Since this heterogeneous reaction between iron and bisulfite ion occurs on the surface of the iron particles, the greater the area of exposed surface, the faster the rate of reaction that occurs. Thus, the particles typically have a size less than about +10 mesh, preferably less than about +100 mesh, and most preferably, less than about +325 mesh.

When this novel composition is made using a sulfite compound and when it is added to an adequate volume of sufficiently acidic water, bisulfite ion is formed from the sulfite ion by Equation 4;

$$(SO_3^=) + H^+ \rightarrow (HSO_3^-) \qquad \text{(Equation 4)}$$

and ferrous dithionite is made therefrom to substantially or completely react the iron particles in accordance with Equation 1. The optimum pH of a final reaction mixture will depend upon the intended use for the dithionite so generated. When dissolved heavy metals are present to be reduced by the dithionite, the reaction pH should be controlled within a range of about 1 to 7, preferably between about 2 and 4.

Upon removing the reclaimed metallic particles from the liquid of the first step, the residual acidic liquor contains dissolved ferrous ions and bisulfite ions and residual dithionite ions. This residual solution is found to be quite negative in ORP (oxidation reduction potential) measurement, (e.g., −400 mv to −600 mv at a pH of 2.5 to 4.5) and is highly useful as an effective reagent for supplying ferrous ions and dithionite ions to the removal of heavy metals from dilute heavy metal solutions, such as process rinse waters in a second stage reaction. Such dilute solutions typically have dissolved heavy metals in a concentration of between 10 and 100 milligrams per liter. Alternatively, water alone can be added to this step to provide the volume of water needed to remove iron as a chelated form in subsequent steps as described below.

The residual liquid from the first reaction step is added as reagent into a second step where reaction occurs in a dilute acid aqueous solution of heavy metals. Other desirable reagents may also be added, such as additional sources of either ferrous ions or dithionite ions or bisulfite ions or iron particles or all of these. The ferrous hydroxide or ferric oxide slurries produced in the third and fourth reaction step(s), respectively, function to entrain oils and greases in the aqueous solution being treated. Some, but not all, of the slurry solids may dissolved. The ferric oxide which may remain undissolved provides nucleation sites for producing larger, heavier, faster settling solids in the subsequent third step.

In the second step reaction, chelated heavy metal ions react in accordance with Equations 2 and 3, with ferrous ions and dithionite ions at a pH between about 1 and 7, preferably at a pH between about 2 and 4. Some, but not all, of the heavy metal ions are reduced to metallic particles. Some of the heavy metal ions complexed previously by chelant anions that may be present dissociate from the chelant ions and become free heavy metal cations. The ferrous ions enhance the breaking of chelant attractions to heavy metal ions. The chelant anion attractions are preferentially transferred to dissolved ferrous ions, which are being recycled and reused in abundant excess. Some ferric oxide or ferric hydroxide contained in the slurry from the third and/or fourth step(s) which is fed to this second step reaction is dissolved and reduced to ferrous ion by the dithionite ions which are present. This reaction further supplants the supply of ferrous ions to the second step and occurs in accordance with Equation 5 as follows.

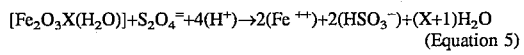
$$[Fe_2O_3X(H_2O)]+S_2O_4^=+4(H^+) \rightarrow 2(Fe^{++})+2(HSO_3^-)+(X+1)H_2O \quad \text{(Equation 5)}$$

Since the process of this invention can be conducted so that no net iron hydroxide sludge is produced, the molar ratio of iron to heavy metals can be increased in this second step to as high as may be needed to further improve the removal of the heavy metal hydroxides. The entire contents of this second step product are transferred to the third step.

The third step reaction occurs with caustic soda or soda ash or an alkaline compound such as magnesium hydroxide or the like added to neutralize the acidity and raise the pH of the solution to an intermediate range of between about 5 to 10, preferably between 6 and 8. This causes some but not necessarily all of the heavy metal ions to precipitate as an unusually dense and fast settling solids material which entrains oils and greases. The solids are precipitated as a slurry which is a mixture of the oils and greases, reduced metallic particles produced in the second step, ferrous hydroxide, ferric oxide and heavy metal hydroxides. The metallic particles formed in the second step acidic reaction and the undissolved ferric oxide particles give this third step hydroxide precipitate a ballast effect that is uncharacteristic of simple hydrated metal hydroxide solids, without the aid of polymers or other floccing agents. These chemical compositions and physical characteristics provide significant advantage for the process of this invention.

The reactions occurring in the third step of this process proceed according to Equations 6 and 7 as in the following:

$$(SO_3)^=+H^+ \rightarrow (HSO_3)^- \quad \text{(Equation 6)}$$

$$(HM^{++})+2(OH^-) \rightarrow HM(OH)_2 \quad \text{(Equation 7)}$$

As free metal cations, both ferrous and heavy metal ions form insoluble hydroxide precipitated solids at slightly acidic to alkaline pH. With the suspended solids of metallic particles and undissolved ferric oxide particles of the secondary step to precipitate upon, the ferrous and heavy metal hydroxides form heavy, dense, fast settling material.

The solids slurry of the third reaction step is withdrawn from the bottom of the settling vessel utilized and is recycled to the first, second, third, and/or fourth reaction step(s) of the process of this invention. The heavy metal hydroxides dissolve in concentrated heavy metal acidic solution, to free and coalesce oils and greases and contribute an alkali value to the neutralization of the strong acid solutions in accordance with Equation 8.

$$HM(OH)_2+2(H^+) \rightarrow (HM^{++})+2H_2O \quad \text{(Equation 8)}$$

The ferrous hydroxide dissolves, forming ferrous ions in the concentrated reaction solution of the first reaction step in accordance with Equation 9.

$$Fe(OH)_2+2(H^+) \rightarrow (Fe^{++})+2H_2O \quad \text{(Equation 9)}$$

The heavy metal content of the hydroxide slurry is about 50 to 250 or more times as concentrated as the heavy metal content in the dilute heavy metal solution feeding to the second reaction step. When the slurry is first mechanically dewatered, even higher ratios are obtained and the volume of the recycle is lowered.

The clarified liquid of the third step is either discarded or it flows into an optional fourth reaction step. A strong oxidizer is added, such as air, oxygen, ozone, hydrogen peroxide, sodium percarbonate, sodium persulfate, or mixtures thereof, or the like, preferably hydrogen peroxide. A measurement of ORP (oxidation-reduction potential) allows control in the range of +400 mv to +700 mv, found to be economical and adequate to accomplish the desired objectives of removing excess reducing agent and to provide sufficient oxygen to promote plant and animal life. Alternatively, the oxidizer can be added to the second or third step.

Substantially, all the iron carried into this fourth step is oxidized to ferric ion, for example when hydrogen peroxide is used, according to Equation 10 as follows:

$$2(Fe^{++})+H_2O_2+2(H^+) \rightarrow 2(Fe^{+++})+2H_2O \quad \text{(Equation 10)}$$

This advantageous properties of ferric ion are thus obtained to effect a more complete removal of the heavy metal ions from the fourth step as insoluble hydroxides coprecipitated with ferric oxide. And, the more readily chelated form of ferric ion is available in the fourth step reaction of the process.

Residual dithionite, bisulfite and sulfite ions are oxidized to sulfate with hydrogen peroxide, for example, according to Equations 11, 12, and 13 as follows:

$$\text{Dithionite } (S_2O_4^=)+H_2O_2 \rightarrow 2(HSO_3^-) \quad \text{(Equation 11)}$$

$$\text{Bisulfite } (HSO_3^-)+H_2O_2 \rightarrow (SO_4^=)+(H^+)+H_2O \quad \text{(Equation 12)}$$

$$\text{Sulfite } (SO_3^=)+H_2O_2 \rightarrow SO_4^=+H_2O \quad \text{(Equation 13)}$$

The oxygen consuming characteristic of these reducing compounds is thus neutralized. Any residual formaldehyde from electroless plating is decomposed to form carbon dioxide and water. All other oxygen consuming chemicals as may be present in the dilute solution are oxidized in this reaction substantially and made less toxic to aquatic life.

A strong chelant also can be introduced in this fourth step, or alternatively, in the second or third step, such as triethanolamine or sodium salts of ethylene-diaminetetraacetic acid, (E.D.T.A.) or diethylenetriaminepentaacetic acid (D.T.P.A.), N-hydroxyethyl)-ethylenediaminetetraacetic acid (H.E.D.T.A.), citric acid, sodium hexametaphosphate, or ammonium lignin sulfonate, preferably triethanolamine together with caustic soda to maintain the pH at a desirable level between about 6 and 12. Some of the ferric iron is chelated, but more of the iron is chelated by the added chelant. The chelated ferric complex remains dissolved and stable in the effluent. The concentration of dissolved iron is controlled by the flow of chelant feeding into the process. The amount of added chelant is controlled to keep an essentially constant inventory of iron in the overall process. The use of a chelant in this method, in combination with the first and second and third steps of this process, eliminates producing and disposing of a regulated hydroxide sludge. Chelate complexes of ferric iron are not known to do any harm in the environment. Their use in general is widespread, with no known regulatory concern. In one alternative embodiment of the invention, no chelant is added and small amounts of sludge or slurry are removed from the process periodically to control iron inventory in the process. In any event, the amount of sludge or slurry is far less than that which is produced by the present processes.

The excess iron feeding to this fourth reaction step, which is the portion that exceeds the holding capacity of the chelating agents, precipitates primarily as insoluble hydrated ferric oxide. Since ferric oxides are less soluble than ferrous hydroxide at a given pH, and are less hydrated, they tend to settle faster and cleaner. Dissolved heavy metals co-precipitate more effectively with this insoluble ferric oxide, so the resulting effluent is lower in heavy metal ion concentrations. Typically, the heavy metal residuals are below atomic absorption spectrophotometry detectability. Some of the ferric oxide slurry is recycled to the second reaction step. Ferric ions improve the replacement of chelated heavy metal ions and aid the formation of heavy metal hydroxides in the third reaction step. Surplus ferric slurry from the fourth step, if any, is recycled to the first reaction step. The balance will be governed by the amount of chelant contained in the heavy metal feedstocks.

Thus, the application discloses a closed-loop method for recycling and reusing the gravity settled slurries of metallic particles, ferrous hydroxide, ferric oxide, and heavy metal hydroxides produced in the alkaline third and fourth steps of the process of this invention.

The slurries are recycled to the first, second, third, and/or fourth steps of this process and mix with acidic metal solutions which are partially neutralized by the alkalinity of the hydroxides saving the cost of purchasing new caustic alkali material.

The heavy metal hydroxides and ferrous hydroxide are dissolved into solution with the concentrated metals. The insoluble ferric oxide is reduced by dithionite ions to make soluble ferrous ions. The heavy metals are reclaimed as metallic particles by the reaction of the first step of this process. The ferrous ion in this solution with the concentrated heavy metals is found to be useful by increasing the rate and improving the efficiency of the reactions. The first reaction step of dithionite reducing the concentrated heavy metals to zero valence is made faster and more efficient in the amount of dithionite required. When dithionite is being generated in situ using iron particles to react with bisulfite ions, then the corresponding improvement occurs by reducing the amount of iron needed and which dissolves and forms ferrous ions. This saves on the raw material cost of iron particles.

By the method of this process, a small enough net quantity of iron particles can be used, as to render it economically feasible to use a chelating agent to keep that used iron soluble in the final dilute alkaline effluent being discharged from the fourth step of the process into the public sewer. Such an amount of soluble iron is held in solution at an alkaline pH by the influence of the chelating agents contained in the concentrated and dilute solutions feeding to this process plus the amount of chelant added into the fourth step of this process.

Referring to the FIG. 1, a stream of concentrated aqueous heavy metal 10, a source of ferrous ion 12, a source of dithionite ion 14, are introduced into container 16. A recycled oils and grease and ferrous hydroxide-containing slurry 18 is introduced from a downstream step 20. Oils and greases are recovered through stream 19. Reclaimed heavy metal is removed through stream 22 and recovered through stream 26 by a filter 24 or the like. A portion 30 of stream 62 from downstream step also can be introduced into container 16 to effect heavy metal precipitate. The liquid effluent 32 from reactor 16 is introduced into reactor 34 and is reacted with stream 28, a portion of stream 62 from downstream tank 36 and dilute heavy metal stream 37 such as is obtained from a rinsing step in a printed circuit production process. Alternatively, inlet stream 37 can be water in order to provide the volume of water required to remove iron as a chelate in solution. Effluent 38 which is acidic and contains heavy metals and iron ions is introduced into tank 40 together with caustic from conduit 42 to raise pH in tank 40 to between about 5 and 10. Effluent 44 is introduced into settling tank 20 to effect entrainment of oils and greases and separation of iron hydroxide containing slurry 46 from clarified liquid solution 48 which is directed into reaction tank 50. In reaction tank 50, liquid effluent 49 is mixed with chelant 52 and oxidizer 54 as well as caustic 56 to effect a pH of between about 6 and 12 in tank 50 and to chelate a portion of the ferric ion in tank 50 and to oxidize substantially all of the ferrous ion in tank 50 to ferric ion and to oxidize substantially all of the reducing agent in tank 50 as well as to provide sufficient dissolved oxygen as desired. Effluent 58 is directed to tank 36 to form an iron containing slurry 60 which may contain oils and greases and which is recycled to tank 34 through conduit 62. Effluent 64 which comprises an aqueous solution of chelated iron is directed to disposal.

The following examples illustrate the present invention and are not intended to limit the same.

EXAMPLE I

In the first test, the feed solution was pumped through the steel wool with no further changes made (without bisulfite). The outflowing liquid was collected and accumulated in a 5 gallon container. Over the period of the test, some removal of copper was visually evident, as the appearance of the entire steel wool mass gradually turned from shiny steel color to copper colored fibers. At the end of the test, the copper content of the 10 liters of collected effluent liquid was tested by atomic absorption (AA) spectrophotometry and contained 72.0 Mg/L copper. This indicates that 28% of the copper in the feed was collected on the steel wool, and shows that less than 25 percent of the iron was used beneficially.

EXAMPLE II

In another test, 3.00 grams of sodium metabisulfite ($Na_2S_2O_5$) were added and dissolved into 10 liters of the prepared copper feed solution of Example I. This modified feed solution was then fed at 200 mls per hour through a new steel wool bed made the same way as in Example I. Within a few minutes after starting the feed, a difference was observed on the appearance of the steel wool compared to the first experiment. Only the feed end portion of the steel wool bed, approximately the first ¼ cm, showed any color effect of copper. As the run proceeded, it was evident that rather than copper covered fibers of steel wool as obtained in the first test, a compact layer of copper particles was forming and being held together by the tightly packed steel wool fibers behaving as a filter. The short length of the coloration zone revealed that an extremely fast reaction rate was being observed. After about 2 hours of operating this test, the effluent from the bed was spot sampled and AA tested for copper, finding only 0.02 Mg/L Cu in the effluent. This same result was repeated after 10 hours, 20 hours, and 30 hours of run time. At 40 hours, the effluent spot sample contained 13 Mg/L of copper and only about ½ cm of steel wool remained. The copper solids were packed up against this plug of steel wool in a mass occupying only about 0.4 cm of length. The bottom 3 cm of the tube was void of solids and contained entering feed solution only. The run was continued to the end of the 10 liters of feed, at which time there was no evidence of fibrous material left from the steel wool. There also was no magnetically responsive material in the solids remaining in the tube. A compact slug of copper solids about 0.5 cm long was left, held in position by the cotton plug used to hold the steel wool in the end of the tube. After the run was completed, the 10 liters of effluent solution was stirred and sampled and analyzed, indicting 11.1 Mg/L of dissolved copper. A rise of about 1 unit was detected in the pH of this solution, measured at 4.9 versus 4.0 for the feed.

EXAMPLE III

Another test was performed by feeding a bisulfite solution is the absence of copper, prepared by dissolving 3 grams of sodium metabisulfite in water and diluting to 100 mls volume and adjusting its pH to 4. This solution was fed in about 30 minutes at 200 mls per hour through a new steel wool column made the same as in the prior tests. The effluent of the bed was directed into a 10 liter quantity of the prepared copper containing solution of Example I, with gentle stirring applied. About fifteen minutes after starting, a change in the copper solution was noted, changing to a greener color. The darkening continued until about near the end of the run, at which point the solution had turned almost black and showed evidence of particulate solids being formed in suspension. By the end of the 30 minute feeding cycle, discrete copper colored solid particles had formed in the 10 liters of liquid being treated. A further 100 ml of flushing water was passed through the remaining bed materials and into the mixing solution. By the end of that time, about another half hour, dense particles of copper were visible in the stirring 10 liters of liquid. After settling for one hour, a sample of supernatant liquid put through a p5 Fisher filter paper was tested and found to contain 38 Mg/L of dissolved copper. The remaining steel wool fibers occupied only about ⅓ of the tubular space and had nearly lost the fibrous shape, becoming more a mass of fine black particles. Upon removing the remaining iron solids from the glass tube, rapid air oxidation took place, generating exothermic heat and rapidly forming rust-like material. This example shows that by contacting the bisulfite with iron prior to contacting copper produced a product capable of precipitation.

EXAMPLE IV

The procedure followed in making up the bisulfite containing copper solution fed to the test Example II above was conducted except in the absence of iron. An equal amount of bisulfite as used in the Example III test above was added into a 10 liter sample of the prepared copper containing solution. Other than a slight darkening of color toward a blue greenish tint, no visible reaction or other change occurred. No solids were formed and no removal of copper was effected by combining the bisulfite and dissolved copper in the same solution in the absence of metallic iron particles.

EXAMPLE V

This test was conducted to determine the influence exerted by chelating agents and ammonium ions in the feed solution. A new copper solution was made up from several source solutions obtained from printed circuit processes. This test solution contained portions of ammoniacal etchant bath, cupric chloride etchant bath, electroless copper plating bath, sulfuric acid/hydrogen peroxide etching bath, sodium persulfate etching bath, and copper sulfate electroplating bath in the approximate proportions that are typical of wastes disposed into a printed circuit plant wastewater system. The final mixed solution was diluted to 200 Mg/L copper and adjusted to pH 3. One liter of the solution was pH adjusted to 9.0 by adding sodium hydroxide with vigorous mixing. Copper hydroxide solids were precipitated and after 15 minutes of mixing, a drop of commercial anionic polymer was added to flocculate the precipitated solids. After settling 15 minutes, a liquid sample was withdrawn and put through a Fisher P5 filter paper and analyzed for dissolved copper. A concentration of 136 Mg/L dissolved copper indicated that 68% of the copper in the feed was effectively chelated or complexed.

The next four experiments were performed using atomized iron powder having particle sizes in the nominal range between −100 mesh and +300 mesh, and having a purity of greater than 99 percent iron, (Examples VI through IX).

EXAMPLE VI

This test was designed to measure the efficiency of removing copper from heavily chelated solutions using the simple cementation reaction with iron particles in the absence of bisulfite or dithionite. One liter of solution of Example V was placed in a beaker and provided with an overhead mixer. An equimolar quantity of iron particles weighing 0.176 grams was added to the solution and mixed for 1 hour. During that time, a coating of deposited metallic copper could be observed forming on the surface of the iron particles. After mixing for the 1 hour period, a sample was withdrawn and filtered and analyzed, indicating that 174 Mg/L or 87% of copper was still dissolved. After mixing for a second hour, another filtered sample indicated 170 mg/L of copper still in the solution, thus completing this experiment. This result indicated an uneconomically low efficiency of about 15 percent for the conversion of surface iron to copper by cementation in what is also an impractical slow reaction.

EXAMPLE VII

This experiment was carried out using another one liter sample of the subject feed solution of Example V. A 1.0 gram amount of sodium metabisulfite was added with vigorous mixing until dissolving was complete, then 0.176 gram of iron powder was added. After about 2–3 minutes, a visually different result was observed happening from that of Example VI. The suspended iron particles more nearly retained their grey-to-black color and tiny particles of copper/reddish material turned the solution to a copper-like color. After 15 minutes of mixing, a sample was withdrawn and filtered and analyzed. A dissolved copper content of 22 Mg/L was measured on the 15 minute sample, indicating 89% removal of copper from the solution

EXAMPLE VIII

In a further experiment of the method of example VII, all conditions were kept the same except that twice as much iron powder was added. After 15 minutes of mixing, a 10 ml sample was withdrawn and filtered and analyzed, obtaining a result of 0.05 Mg/liter of dissolved copper. A pH of 4.8 was measured on the reacted solution. A magnet was placed against the bottom of the beaker and then moved up the side of the glass attracting the unreacted iron particles which were observed to be black and not coated with a layer of deposited copper.

EXAMPLE IX

In this experiment, the resulting beaker of the experiment of Example VIII was settled for 15 minutes and the liquid portion was decanted off, leaving the solids in the bottom covered with a few milliliters of liquid. A new one liter portion of the subject feed solution was added to these contents and instantly, a new portion of 1 gram of sodium metabisulfite was added and dissolved with vigorous mixing. After mixing 15 minutes, a sample was filtered and analyzed, finding 39.2 Mg/L dissolved copper remaining in solution. No magnetic iron was found remaining in the copper colored metallic solids. The total copper removed in the two reactions by the one charge of 0.352 grams of iron is 360.65 milligrams, which calculates as an efficiency in the use of the iron at 90.16 percent.

EXAMPLE X

A one liter sample of strongly acidic spent ammonium persulfate etchant containing 20.3 grams/liter of copper was neutralized with 110 mls of 50% sodium hydroxide to a 4.7 pH. An aliquot of 100 mls of aqueous solution containing 9.8 grams of dissolved sulfur dioxide was added, dropping to a 1.7 pH. With vigorous mixing, 20.3 grams of iron powder was added. A very rapid reaction producing large, fast settling copper metal particles in about four minutes was observed. Mixing was discontinued at 10 minutes of reaction time. After one minute of settling, a sample was drawn, filtered, and tested by Atomic Absorption Spectrophotometry (AA). It gave 0.33 Mg/liter in copper concentration. After vacuum filtering and water rinsing, the recovered solids were air dried for two weeks. A net weight of 23.83 grams of coppery colored dry solids containing the 20.3 grams of copper were obtained.

Example XI

A one gallon per minute stream of industrial wastewater containing a complex matrix of dissolved heavy metals and dissolved oil and grease was fed to a continuous, flow-through reaction system unit. Typically, the oil and grease content of this stream measures at 800 to 1000 MgL. This wastewater was generated in a plant that effects a wide range of metal processing operations that include electroplating of copper, chrome, and nickel, and electroless plating of both copper and nickel. In addition, galvanizing of steel with zinc and hot dip tinning of metals were effected. Hot oil baths were used for quenching the work leaving the hot dip molten metal baths. Washing and rinsing the work materials to remove the quench oil residues caused a relatively high amount of miscible organic material to remain dissolved in the wastewater, after skimming off the immiscible and recoverable oil from the water. The one gallon per minute flow of untreated wastewater was analyzed and found to contain dissolved heavy metals in amounts of copper at 7.4 Mg/L nickel at 11 Mg/L, cadmium at 0.05 Mg/L, chromium at 0.19 Mg/L, lead at 0.88 Mg/L, and zinc at 4.4 Mg/L. In the first tank of the pilot unit, the wastewater was dosed with a reagent solution containing dissolved ferrous ions, bisulfite ions, and dithionite ions; which comprised the supernatant liquid produced from having precipitated by the reaction of in-situ generated ferrous dithionite, metallic heavy metal particles from an acidic solution; previously formed by dissolving a metal hydroxide sludge solution; previously formed by dissolving a metal hydroxide sludge in concentrated waste acid plating bath. This first reagent dosing treatment step was performed at a pH between about 2 and 3, and at a dosage of reagent that resulted in a ferrous ion concentration in the water of approximately 200 Mg/L of dissolved iron. The first tank overflowed into a second mixed tank, into which 50% caustic soda was added by a metering pump on pH control, at a controlled pH of about 9, producing a dilute slurry of coprecipitated ferrous hydroxide and heavy metal hydroxide particles. The dilute slurry overflowing the second tank flowed into a chamber within a third tank wherein an anionic polymer entered a section of the tank provided with slow and gentle mixing. A dense, fast-settling floc of suspended solids was produced which flowed into the bottom of a fourth tank, which with no mixing, allowed the solids to settle on the bottom and provided clear, solids-free effluent to overflow from a wier at the top. Atomic absorption analyses on this clear, gravity settled effluent gave non-detectable for all the heavy metals in the inflowing wastewater. After gravity settling and thickening, the solids collected from the fourth tank of the pilot unit, and upon acidifying and dissolving this sludge by adding and mixing it to a pH of about 2 with a concentrated waste acid plating bath solution, it was observed that an immiscible floating skim of oil formed upon the surface of the acidic solution when the mixer was shut off. It was considered that for such an amount of oil to form on this solution, it must have been absorbed in the alkaline metal hydroxide sludge from which the solution had been prepared. The oil had been dissolved in the wastewater and was removed in the one gall per minute unit. To further understand these observations, a sample of the clear, gravity settled effluent was tested for oil and grease analysis. The result obtained was that the treated effluent contained zero detectable oil or grease, of either petroleum origin or animal fats origin.

I claim:

1. The process for removing a first composition selected from the group consisting of an oil, a grease, and mixtures thereof from an aqueous composition which contains said first composition which comprises;

(a) in a first reaction step, admixing said aqueous composition with an acidic aqueous solution containing ferrous ion, sulfite and/or bisulfite ion and dithionite ion at a pH between about 1 and 7 to form a first liquid effluent (b) in a second reaction step, admixing and reacting said first liquid effluent with a water soluble alkali composition to effect a pH of between about 6 and 12 and to produce a metal hydroxide precipitate containing oil and/or grease, (c) separating said metal hydroxide precipitate from a second liquid effluent, (d) mixing said metal hydroxide precipitate containing said oil and/or grease with an acid at a pH between about 1 and 4 to effect dissolving of said metal hydroxide precipitate and separation of oil and/or grease and to form an acidic solution containing ferrous ion, (e) recovering said oil and/or grease, (f) in a third reaction step adding a source of ferrous ion, sulfite or bisulfite ion and dithionite ion to said acidic aqueous solution to form a third liquid effluent, and (g) cycling said third liquid effluent to said first reaction step.

2. The process of claim 1 wherein said aqueous composition also contains dissolved heavy metals which comprises;

(a) in a first reaction step, admixing said aqueous composition with an acidic aqueous solution containing ferrous ion, sulfite and/or bisulfite ion an dithionite ion at a pH between about 1 and 7 to form a first liquid effluent (b) in a second reaction step, admixing and reacting said first liquid effluent with a water soluble alkali composition to effect a pH of between about 6 and 12 and to produce a metal hydroxide precipitate containing oil and/or grease, (c) separating said metal hydroxide precipitate from a second liquid effluent, (d) mixing said metal hydroxide precipitate containing said oil and/or grease with an acid at a pH between about 1 and 4 to effect dissolving of said metal hydroxide precipitate and separation of oil and/or grease and to form an acidic solution containing ferrous ion and heavy metal ions, (e) recovering said oil and/or grease, (f) in a third reaction step adding a source of ferrous ion, sulfite or bisulfite ion and dithionite ion to said acidic aqueous solution to precipitate metal particles of heavy metals and to form a third liquid effluent, (g) recovering said heavy metal particles and (h) cycling said third liquid effluent to said first reaction step.

3. The process of claim 2 wherein said first aqueous solution contains industrial metal plating waste.

4. The process of claim 2 wherein said first aqueous solution contains industrial metal etching waste.

5. The process of claim 2 wherein said first aqueous solution contains industrial ion exchange regenerant liquid.

6. The process of claim 2 wherein said first aqueous solution contains metals extracted from ores.

7. The process of claim 2 wherein said first aqueous solution contains metal ions obtained by dissolving metal hydroxides in acid.

8. The process of claim 2 wherein said first aqueous solution contains metal ions obtained by dissolving metal oxides in acid.

9. The process of claim 2 wherein the pH in the first step reaction is between about 1 and 4.

10. The process of claim 2 wherein the pH in the second reaction step reaction is between about 1 and 5.

11. The process of claim 2 wherein the pH in the third reaction step is between about 5 and 10.

12. The process of claim 2 wherein said ferrous ion is produced in situ from iron particles.

13. The process of claim 2 wherein the source of said ferrous ion is ferrous dithionite.

14. The process of claim 2 wherein the source of said ferrous ion is ferrous sulfate.

15. The process of claim 2 wherein the source of said ferrous ion is ferrous bisulfite.

16. The process of claim 2 wherein the source of said ferrous ion is ferrous sulfite.

17. The process of claim 2 wherein the source of said ferrous ion is ferrous hydroxide.

18. The process of claim 2 wherein the source of said ferrous ion is ferric oxide reduced by dithionite ion.

19. The process of claim 2 wherein said dithionite ion is produced in-situ by reacting bisulfite ion and iron particles.

20. The process of claim 2 wherein said dithionite ion is produced in-situ by reacting bisulfite ion and zinc particles.

21. The process of claim 2 wherein said dithionite ion is produced in-situ by reacting bisulfite ion and aluminum particles.

22. The process of claim 2 wherein said dithionite ion is produced in-situ by reacting bisulfite ion and sodium borohydride.

23. The process of claim 2 wherein the source of said dithionite ion is sodium hydrosulfite.

24. The process of claim 2 wherein the source of said dithionite ion is zinc hydrosulfite.

25. The process of claim 2 wherein the source of said dithionite ion is aluminum hydrosulfite.

26. The process of claim 2 wherein said heavy metal is a composition containing at least one metal selected from the group consisting of copper, tin, lead, nickel, chromium, cadmium, cobalt, mercury, silver, gold, platinum, palladium, vanadium, arsenic, antimony, bismuth, indium, rhodium, ruthenium, technetium, molybdenum, niobium, osmium, iridium, uranium, plutonium, a lanthanide, and an actinide.

27. The process of claim 2 wherein the source of said bisulfite ion is an alkali metal bisulfite.

28. The process of claim 2 wherein the source of said dithionite ion is an alkali metal sulfite.

29. The process of claim 2 wherein the source of said dithionite ion is sulfur dioxide in water.

30. The process of claim 2 wherein the source of said dithionite ion is sulfur dioxide with an alkali metal hydroxide.

31. The process of claim 2 wherein said aqueous composition is a aqueous solution of heavy metals.

32. The process of claim 31 wherein said aqueous solution of heavy metals contains chelated metal ions.

33. The process of claim 31 wherein said aqueous solution of heavy metals is contaminated groundwater.

34. The process of claim 31 wherein said aqueous solution of heavy metals is landfill leachate water.

35. The process of claim 31 wherein said aqueous solution of heavy metals is municipal sewerage.

36. The process of claim 31 wherein said aqueous solution of heavy metals is mine shaft drainage water.

37. The process of claim 31 wherein said aqueous solution of heavy metals is slag pile drainage water.

38. The process of claim 31 wherein said aqueous solution of heavy metals is mine tailings pile drainage water.

39. The process of claim 31 wherein said aqueous solution of heavy metals contains dissolved metals in a concentration between about 0.1 and 200 milligrams per liter.

* * * * *